W. BLACKMORE.
COUPLING AND YOKE.
APPLICATION FILED AUG. 1, 1908.
1,022,652.
Patented Apr. 9, 1912.
2 SHEETS—SHEET 1.
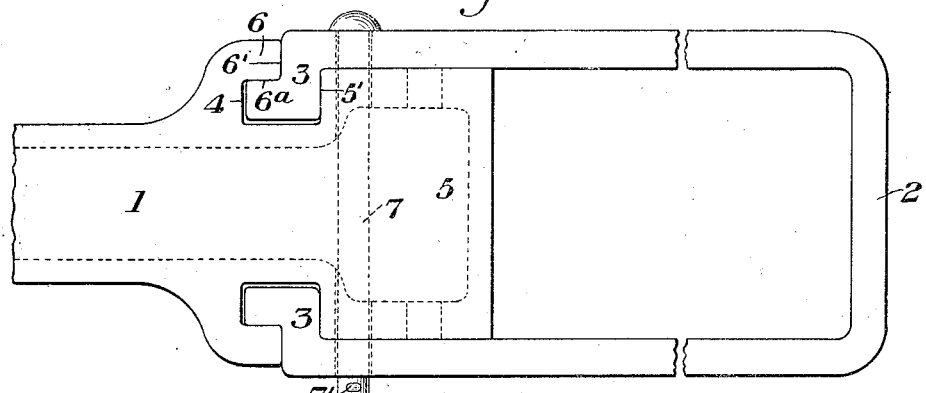
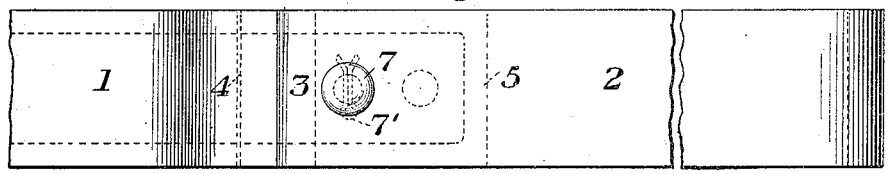
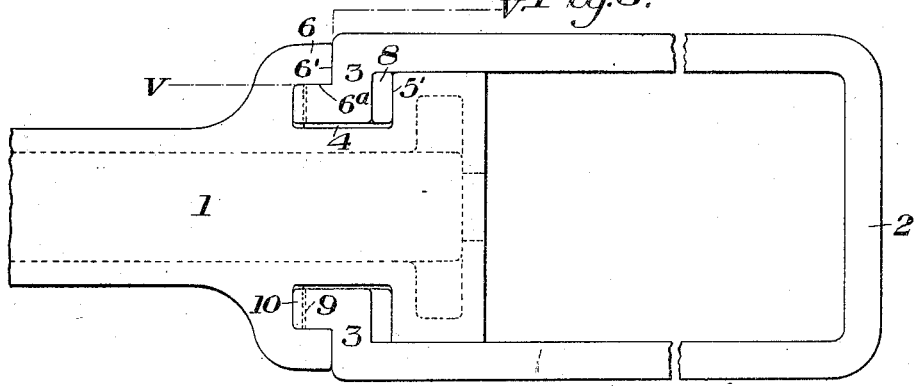
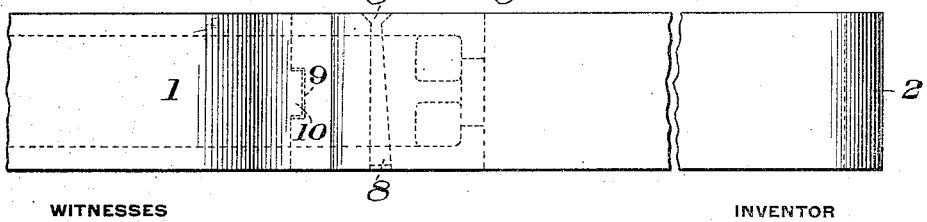
WITNESSES
R. A. Balderson
W. W. Swartz
INVENTOR
Wm Blackmore,
by Bakewell, Byrnes & Parmelee,
his attys.

W. BLACKMORE.
COUPLING AND YOKE.
APPLICATION FILED AUG. 1, 1908.

1,022,652.

Patented Apr. 9, 1912.

2 SHEETS—SHEET 2.

WITNESSES
R. A. Balderson
W. W. Swartz

INVENTOR
Wm. Blackmore,
by Bakewell, Byrnes & Parmelee,
his Attys.

UNITED STATES PATENT OFFICE.

WILLIAM BLACKMORE, OF CLEVELAND, OHIO, ASSIGNOR TO THE NATIONAL MALLEABLE CASTINGS COMPANY, OF CLEVELAND, OHIO, A CORPORATION OF OHIO.

COUPLING AND YOKE.

1,022,652.　　　　　Specification of Letters Patent.　　　Patented Apr. 9, 1912.

Application filed August 1, 1908. Serial No. 446,433.

*To all whom it may concern:*

Be it known that I, WILLIAM BLACKMORE, of Cleveland, in the county of Cuyahoga and State of Ohio, have invented a new and useful Improvement in Couplers and Yokes, of which the following is a specification, reference being had to the accompanying drawings, forming part of this specification, in which—

Figure 5:
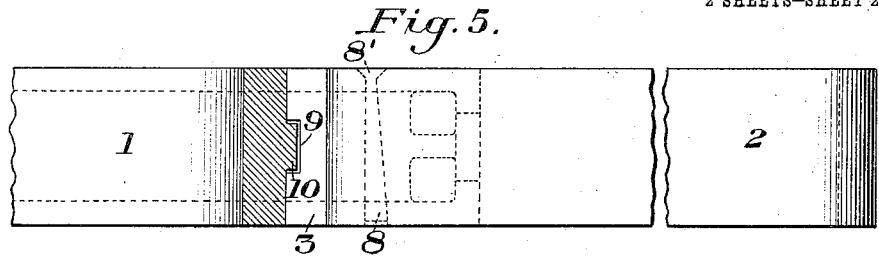
Figure 6:
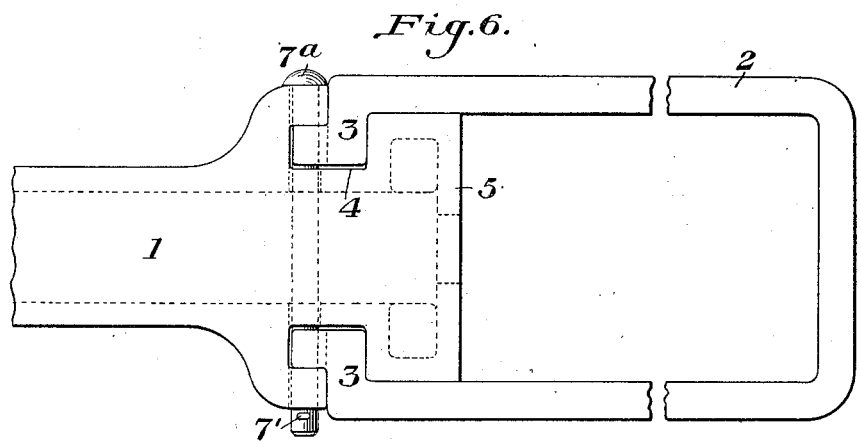
Figure 7:
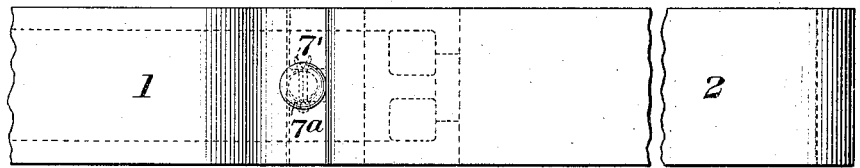
Figure 8:
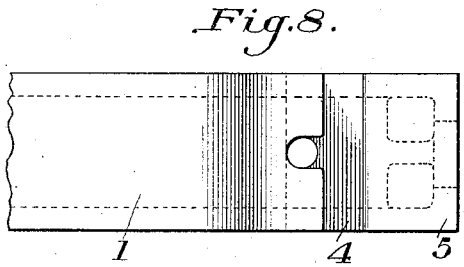
Figure 9:
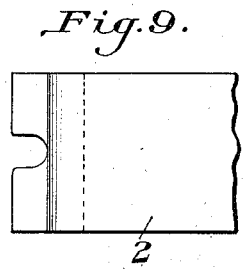

Figure 1 is a side elevation of part of the coupler shank and the yoke attached together; Fig. 2 is a bottom plan view of Fig. 1; Fig. 3 is a side elevation showing a modified construction; Fig. 4 is a plan view of Fig. 3; Fig. 5 is a plan view, partly in section, on the line V—V of Fig. 4; Fig. 6 is a side elevation showing another modification; Fig. 7 is a bottom plan view thereof; Fig. 8 is a top plan view with the holding pin removed; and Fig. 9 is a detail plan view of the forward end of the yoke.

Heretofore in the attachment of the yoke to the coupler shank in some kinds of draft rigging it has been sought not only to relieve the rivets of the yoke from pulling strains by providing the arms of the yoke at their forward ends with inwardly projecting lips which engage on their rear side with the liner block of the coupler shank, but also to relieve the rivets from buffing strains by providing lugs on the coupler shank which engage with the forward sides of the lips of the yoke; but the protection which this has given has proved to be inadequate, for the lips on the forward side do not extend a greater distance than the level of the liner blocks, and when longitudinal stress is applied to the yoke the tendency is to bend the lips.

The purpose of my invention is to obviate this difficulty and otherwise to provide a strong and simple attachment between the coupler shank and the yoke.

The preferred form of my invention is illustrated in Figs. 1 and 2, in which 1 is the coupler shank and 2 is the yoke. The yoke at the forward end of each arm has an inwardly and forwardly shaped lip 3 approximately of L-form, and the coupler shank, on its top and bottom, has an L-shaped recess 4 which is adapted to fit approximately the L-shaped lip 3. The recess 4 lies between the forward surface 5' of the liner block of the coupler shank and the opposite lug 6, which projects outwardly and rearwardly from the coupler shank and in advance of the liner block. The dimensions of the recess are such that the surface 5' of the liner block and the surfaces 6' and 6ᵃ of the lug 6 fit the lip 3 of the yoke and the lip 3 extends transversely the entire width of the yoke, thus affording a broad and substantial bearing surface; but I prefer to provide a sufficient clearance between the lip 3 and the other surfaces of the recess, as shown in Fig. 1, so that if there should be any lack of uniformity in the casting of the coupler shank the lip or yoke can still be inserted within the recess 4. The bearing of the lip 3 against the surfaces 5', 6' and 6ᵃ makes a very secure connection between the yoke and the coupler shank, both in buffing and pulling, and makes it unnecessary to use the ordinary system of riveting. Instead of the ordinary rivets I prefer to use a pin 7 which is inserted through one of the ordinary holes in the yoke and liner block and is retained in place by a cotter 7'. I prefer, however, to provide the coupler shank as heretofore, with the ordinary rivet holes, so that if at any time the specially constructed yoke illustrated in the drawings is not obtainable, an ordinary yoke can be applied to the coupler, the lips 3 of the yoke fitting within the recesses 4 and the yoke being held to the coupler shank by the ordinary rivets.

In the modification shown in Figs. 3–5 I enlarge the recess 4 so as to provide a space between the surface 5' of the liner block and the rear side of the lug 3, in which space a transverse wedge-shaped key 8 can be inserted after the yoke has been put in place. The surface 5' is transversely inclined in order to match the inclined side of the wedge, and when the wedge has been driven its smaller end can be upset, as at 8', in order to retain the wedge in place. The wedge, being thus interposed between the lip of the yoke and the surface 5', forces the lip 3 into close contact with the surface 6' of the lug 6, holding it without any loose play. In order to retain the yoke from lateral displacement and to render it unnecessary to employ any rivets or holding pins for the yoke, I prefer to provide the ends of the arms of the yoke with recesses 9 into which projections 10 on the lug 6 fit. When the parts are assembled the increased distance between the surfaces 5' and 6' enables the lip to be inserted at the rear of the recess 4 and moved transversely until the sides of the yoke are in alinement with the sides of the coupler shank. The yoke can then be pushed forwardly, so as to bring the recesses 9 and projections 10 into engagement, whereupon the parts are firmly secured together by driving and upsetting the wedge 8, as above described.

In the modification shown in Figs. 6–9 the construction is similar to that shown in Figs. 1 and 2, except that the holding pin 7ª is passed through the lugs 6 and the forwardly projecting portions of the lips 3. This construction renders it unnecessary to form holes through the body of the yoke, it being only necessary to construct the forward ends of the lips 3 and the rear ends of the lugs 6 with recesses through which the pin 7ª can pass. The pin can then be held by a cotter 7'. or otherwise.

Within the scope of my invention as defined in the claims the parts of the device may be modified in various ways by those skilled in the art, since

What I claim is:—

1. A yoke and coupler shank, the yoke having a lip extending transversely the entire width of the yoke, said lip extending inwardly and then forwardly, and the coupler shank having a recess also extending inwardly and then forwardly, said lip and recess having angular interfitting portions which prevent relative lateral movement of the coupler and yoke; substantially as described.

2. The combination in a draw bar, of a coupler, a yoke having inturned ends extending into recesses in the coupler, means for preventing spreading of the yoke, and distance pieces to force the yoke into snug engagement with such means.

In testimony whereof, I have hereunto set my hand.

WILLIAM BLACKMORE.

Witnesses:
HARRY E. ORR,
HENRY F. POPE.